2,906,738
Patented Sept. 29, 1959

2,906,738

PROCESS OF CURING POLYMERS OF TETRAHYDROFURAN

Earl J. Goldberg, Wilmington, Del., assignor to E. I. du Pont de Nemours and Company, Wilmington, Del., a corporation of Delaware No Drawing. Application November 19, 1956
Serial No. 622,813

14 Claims. (Cl. 260—77.5)

This invention relates to high molecular weight polytetrahydrofuran, copolymers of tetrahydrofuran, and poly(polytetramethyleneether) urethanes, and more particularly to a curing process for these polymers involving the use of free radical generators and N,N'-substituted bismaleimides as free radical acceptors.

The curing of polymers by means of free radical generators such as organic peroxides is known; however, this procedure is not entirely satisfactory since the peroxide tends to cause degradation of the polymers with undesirable side reactions, and in some instances, the properties of the cured polymers are not entirely satisfactory.

It is an object of the present invention to provide a process for curing high molecular weight polymers selected from the group consisting of polytetrahydrofuran, copolymers of tetrahydrofuran and poly(polytetramethyleneether) urethanes. A further object is to provide a process for curing these high molecular weight polymers involving the use of free radical generators and free radical acceptors. A still further object is to provide high molecular weight polymers selected from the group consisting of polytetrahydrofuran, copolymers of tetrahydrofuran and poly(polytetramethyleneether) urethanes having incorporated therewith a free radical generator and an N,N'-substituted bismaleimide as a free radical acceptor. Other objects will appear hereinafter.

These and other objects of the following invention are accomplished by a process for curing high molecular weight polymers selected from the group consisting of polytetrahydrofuran, copolymers of tetrahydrofuran and poly(polytetramethyleneether) urethanes, which comprises incorporating with said polymers a free radical generator and a free radical acceptor, i.e., an N,N'-substituted bismaleimide, and heating until the polymer is cured. The process of the present invention is free of the undesirable features associated with peroxide type cures.

Representative free radical generators which may be incorporated with the polymers according to the present invention include organic peroxides and azobisaliphatic nitriles. The organic peroxides include compounds such as dicumyl peroxide [also kown as bis(a,a-dimethylbenzyl) peroxide], dibenzoyl peroxide, di-tert-butyl peroxide, cumene hydroperoxide, methyl ethyl ketone peroxide, tert-butyl perbenzoate and di-N-methyl-tert-butyl percarbamate. Representative azobisaliphatic nitriles include compounds such as 1,1'-azobisisobutyronitrile, 1,1'-azobis-(α-γ-di-methyl-valeronitrile) and 1,1'-azobiscyclohexane carbonitrile.

The free radical acceptors which are used in conjunction with the free radical generators in the process of the present invention are N,N'-substituted bismaleimides, which may be represented by the formula:

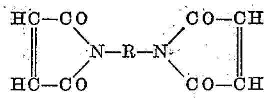

wherein R is an alkylene or an arylene radical. Representative bismaleimides include N,N'-ethylene bismaleimide, N,N'-methylene bismaleimide, N,N'-tetramethylene bismaleimide, N,N'-hexamethylene bismaleimide, N,N'-phenylene bismaleimide, N,N'-naphthalene bismaleimide, and N,N'-pyrenylene bismaleimide.

The quantity of free radical generator used will depend on the degree of cure desired and the reactivity of the polymer being cured. In general, at least 0.5% by weight is required and preferably 1.0–3.0% is used. Greater quantities may be used but the economics of such addition is unfavorable. The quantity of N,N'-substituted bismaleimide used preferably ranges from about 1.0 to 6.0% by weight of the polymer. Here again, the state of cure desired has a governing effect. The weight of the free radical generator may be less, equal to, or more than the weight of the N,N'-substituted bismaleimide, with about 10% being a reasonable upper limit.

The high molecular weight polymers which may be cured according to the process of the present invention include polytetrahydrofuran, copolymers of tetrahydrofuran and poly(polytetramethyleneether) urethanes. In general, these polymers should have a molecular weight of at least about 5000 and should be solids; however, it is to be understood that high molecular weight liquid polymers may also be used.

The polytetrahydrofuran are polytetramethyleneether polymers and may be obtained by the polymerization of tetrahydrofuran in the presence of an acid catalyst. The copolymers of tetrahydrofuran may be obtained by the polymerization of tetrahydrofuran with 3- or 4-membered cyclic ethers. These copolymers should contain at least 50 mol percent of tetramethyleneether units derived from tetrahydrofuran. The other portion will consist of ethylene- or trimethyleneether units which may carry on the carbon atoms substituents inert to the polymerization conditions. The preparation of polyethers of these types is disclosed in German Patents 741,478; 880,489; 914,435 and 914,438.

The poly(polytetramethyleneether) urethanes are compounds which may be prepared by the reaction of a polytetramethyleneether glycol of molecular weight at least 750 with a molar excess of an organic diisocyanate to provide an isocyanate-terminated polymer, followed by the reaction with a chain-extending agent containing a plurality of active hydrogen atoms. Copolymers of tetrahydrofuran possessing terminal hydroxyl groups may be substituted for the polytetramethyleneether glycols. Any of a wide variety of organic diisosyanates may be used to react with the polytetramethyleneether glycol, including toluene-2,4-diisocyanate, m-phenylenediisocyanate, 4-chloro-1,3-phenylenediisocyanate, 4,4'-biphenyldiisocyanate, 1,5-naphthylenediisocyanate, 1,4-tetramethylenediisocyanate, 1,6-hexamethylenediisocyanate, 4,4'-methylenediphenylisocyanate, 1,10-decamethylenediisocyanate, 1,4-cyclohexylenediisocyanate, 4,4'-methylene-bis-(cyclohexylisocyanate), and 1,5-tetrahydronaphthylenediisocyanate. Representative chain-extending agents which may be used to react with the isocyanate-terminated polymer include compounds such as water, hydrogen sulfide, and organic compounds containing active hydrogen in the form of groups, such as hydroxyl, amino, carboxyl, etc.

The poly(polytetramethyleneether) urethanes may be represented by the formula $$\left[-HN-\left(B-NH-\overset{O}{\overset{\|}{C}}-O-C_4H_8-O-\overset{O}{\overset{\|}{C}}-NH\right)_n-B-NH-\left(Q-HN-B-NH\right)_m-\right]$$

wherein B is the organic diisocyanate residue, Q is a carbonyl or non-polymeric diacyl radical resulting from the chain-extending agent, and *n* and *m* are integers. These polyurethane polymers are more particularly described in U.S. Patent 2,734,045. It is to be understood that these polyurethane polymers may contain a wide variety of substituents which will not interfere with the curing process of the present invention, such as unsaturated side chain groups, and, in addition, it is apparent from the above formula that these polyurethane polymers may contain intralinear urea or amide linkages.

Another method available for the preparation of these poly(polytetramethyleneether) urethane polymers is the reaction of the bischloroformate of the polytetramethyeneether glycol with an organic diamine, followed, if desired, by the reaction with an acid or carbamyl halide. It is quite obvious that various modifications may be made in preparing these polyurethanes and their preparation will be more particularly described in the following examples.

In carrying out the process of the present invention, it is necessary merely to mix, by standard milling procedures, the free radical generator and the N,N′-substituted bismaleimide with the polymer which is to be cured, and to heat until a cure is obtained. The temperature range may vary within wide limits depending upon the particular generator, N,N′-substituted bismaleimide, and polymer being used. However, heating to temperatures of about 50–200° C. for from 30 minutes to several hours is ordinarily adequate. Longer times and/or higher temperatures may be used in the case of the more chemically inert polymers or with the more thermally stable free radical generators.

The following examples will better illustrate the nature of the present invention; however, the invention is not intended to be limited to these examples. Parts are by weight unless otherwise indicated.

*Example 1*

A poly(polytetramethyleneether)urethane polymer is prepared by heating 950 parts of polytetramethyleneether glycol of molecular weight 986, containing less than 0.025% water and 1% phenyl-β-naphthylamine, with 112 parts of toluene-2,4-diisocyanate for 3 hours at 100–105° C. while agitating to form a polyurethane glycol. 200 parts of this polyurethane glycol is mixed with 0.35 part of water in a Werner-Pfleiderer mixer and then 24.3 parts of toluene-2,4-diisocyanate is added and mixing continued for 2 hours at 70–75° C. Then 7.64 parts of water is added and mixing continued for 22 minutes, at which time the temperature is 120° C. and the mixture is a rubbery mass. 1 part of piperidine is added and thoroughly mixed in to stabilize the polymer. The polymer is then milled on a rubber roll mill and sheeted off.

100 parts of the polymer is compounded on a rubber roll mill with 45 parts of high abrasion furnace black at 100–110° C. The roll temperature is then reduced to 35–40° C. 2 parts of 1,1′-azobiscyclohexane carbonitrile and 4 parts of N,N′-m-phenylene bismaleimide are milled in. The stock is sheeted off the mill.

A control is compounded in the same way except that no N,N′-m-phenylene bismaleimide is added.

The stocks are cured in molds in a press at a platen pressure of 10,000 pounds per square inch for 1 hour at 140° C. The molded pieces are then conditioned by storing for 18 hours at room temperature at 50% relative humidity. The modulus at 200% elongation at 25° C. in water is determined. The sample shows a value of 1500 pounds per square inch, while the control is only 520 pounds per square inch, thus showing the much higher state of cure obtained by the use of the N,N′-m-phenylene bismaleimide.

*Example 2*

A polytetramethyleneether polymer is prepared from tetrahydrofuran. The tetrahydrofuran is purified by first refluxing over and distilling from sodium hydroxide and then refluxing over and distilling from lithium aluminum hydride. To 250 parts of the purified tetrahydrofuran is added 0.05 mol percent of antimony pentachloride and let stand for 48 hours at 0° C.

The mass is dissolved in 3000 parts of hydrofuran and 1 part of phenyl-β-naphthylamine, 30 parts of water and 30 parts of aqueous ammonium hydroxide (28%) are stirred in. The polymer is precipitated by pouring the solution into a large excess of water. The polymer is collected and washed with water until neutral. The polymer is then dried on a rubber roll mill at 100–110° C.

A practically colorless, somewhat rubbery polymer is obtained, which has an inherent viscosity in 0.1% solution in benzene at 30° C. of 4.3, indicating a number average molecular weight of about 350,000. 100 parts of the polymer is milled on a rubber roll at 35–40° C. with 30 parts of high abrasion furnace black and 1 part of dicumyl peroxide and 4 parts of N,N′-m-phenylene bismaleimide and then sheeted off the mill.

A control is compounded in the same way except that no N,N′-m-phenylene bismaleimide is used.

The compounded stock is cured in molds in a press at 150° C. for 1 hour. The cured pieces are conditioned for 18 hours at room temperature at 50% relative humidity.

The cured polymer shows the following properties in water at 25° C.:

| | |
|---|---|
| Tensile strength at the break, lbs./sq. in. | 4600 |
| Modulus at 300% elongation, lbs./sq. in. | 2500 |
| Elongation at the break, percent | 400 |
| Yerzley resilience | 76 |

The control sampled did not cure sufficiently to permit testing.

*Example 3*

1000 parts of polytetramethyleneether glycol of molecular weight 985 is added slowly to 1000 parts of liquid phosgene at 0–10° C. while stirring. Vaporized phosgene is returned to the reaction by a reflux condenser. The addition requires about 1 hour and the mass is stirred 1 hour longer. The mass is then allowed to warm to 25–30° C. while phosgene boils off. Finally, nitrogen is blown through the mass until the exit gas shows an absence of phosgene.

44.4 parts of the polytetramethyleneether bis-chloroformate thus obtained is dissolved in 150 parts of benzene. To this is added simultaneously with vigorous agitation a solution of 9.2 parts of N,N′-diisobutyl hexamethylene diamine and a solution of 10 parts of sodium carbonate in 225 parts of water. The mixture is then stirred an additional 10 minutes. 0.5 part of phenyl-β-naphthylamine is added and the mass is poured into 1000 parts of water. The mass is boiled 20 minutes, the water changed and boiled for 20 minutes longer. The poly(polytetramethyleneether)urethane polymer is collected and washed on a rubber wash mill with water at 40–50° C. for 10 minutes. It is transferred to a rubber mill and dried by milling at 110–120° C. for 10 minutes.

100 parts of the polymer, 30 parts of high abrasion furnace black, 1 part of dicumyl peroxide and 3 parts of N,N′-m-phenylene bismaleimide are compounded on a rubber mill at 50–60° C. for 10 minutes. The compounded stock is cured in molds in a press for 1 hour at 150° C. to yield a tough, resilient elastomer with the following properties in water at 25° C.:

| | |
|---|---|
| Tensile strength at the break, lbs./sq. in. | 1500 |
| Modulus at 300% elongation, lbs./sq. in. | 780 |
| Elongation at the break, percent | 330 |
| Yerzley resilience, percent | 61 |

When an equal quantity of N,N′-ethylene bismaleimide is substituted for the N,N′-m-phenylene bismaleimide in the above curing process, an elastomer having similar properties is obtained.

*Example 4*

A polytetramethyleneether bischloroformate is prepared from a solution of 542 parts of polytetramethyleneether glycol having a molecular weight of 2990 in 540 parts of benzene and 600 parts of liquid phosgene. The resulting benzene solution contains 58.1 parts of polytetramethyleneether bischloroformate per 100 parts of solution.

53.7 parts of this polytetramethyleneether bischloroformate solution is dissolved in 135 parts of benzene. To this solution is added simultaneously 1.5 parts of 2,4-bis(methylamino)toluene and a solution of 2.5 parts of sodium carbonate in 150 parts of water. The mixture is stirred vigorously for 20 minutes. 0.35 part of phenyl-β-naphthylamine is added and the mass is poured into 1000 parts of water. The mass is boiled and the poly-(polytetramethyleneether) urethane polymer washed and dried as above.

100 parts of the polymer, 30 parts of high abrasion furnace black, 1 part of dicumyl peroxide and 3 parts of N,N′-m-phenylene bismaleimide are compounded on a rubber mill at 50–60° C. for 10 minutes. The compounded stock is cured in molds in a press for 1 hour at 150° C. The resulting elastomer has the following properties in water at 25° C.:

| | |
|---|---|
| Tensile strength at the break, lbs./sq. in. | 2000 |
| Elongation at the break, percent | 300 |
| Yerzley resilience, percent | 70 |

*Example 5*

30 parts of 2,4 - bis(methylamino)toluene is dissolved in 890 parts of benzene. 150 parts of calcium hydroxide is added. The mixture is stirred at room temperature and a solution of 148 parts of polytetramethyleneether bischloroformate of Example 3 in 440 parts of benzene is added over a period of 2 hours. The mixture is stirred overnight and then filtered. The benzene solvent is removed from the filtrate by gradually raising the temperature to 100° C. and reducing the pressure to 1 mm. The resulting polyurethane diamine has a molecular weight of 2520.

12.6 parts of this polyurethane diamine is dissolved in 44 parts of methylene chloride. To the solution is added simultaneously a solution of 1.02 parts of terephthaloyl chloride in 44 parts of methylene chloride and a solution of 1 part of sodium carbonate in 100 parts of water. The mixture is stirred vigorously for 20 minutes. 0.15 part of phenyl-β-naphthylamine is added and the mass is poured into 500 parts of water. The mass is boiled and the poly(polytetramethyleneether) urethane polymer washed and dried as above.

100 parts of the polymer, 30 parts of high abrasion furnace black, 1 part of dicumyl peroxide and 3 parts of N,N′-m-phenylene bismaleimide are compounded on a rubber mill for 10 minutes at 50–60° C. The compounded stock is cured in molds in a press for 1 hour at 150° C. The resulting elastomer has the following properties in water at 25° C.:

| | |
|---|---|
| Tensile strength at break, lbs./sq. in. | 1830 |
| Modulus at 300% elongation, lbs./sq. in. | 1150 |
| Elongation at break, percent | 410 |

*Example 6*

100 parts of phosgene is dissolved in 400 parts of o-dichlorobenzene at 0° C. To this solution is added slowly a solution of 60 parts of methylene-bis(N-methylaniline) in 200 parts of o-dichlorobenzene with stirring at 0–10° C. The mixture is heated slowly to reflux with a stream of phosgene bubbling through the solution. The solution is refluxed 1 hour with phosgene passing through. The refluxing solution is then blown with nitrogen until the exit gas is free of phosgene and hydrogen chloride. The pressure is reduced and the o-dichlorobenzene distilled off. The residue crystallizes on cooling. The material is recrystallized twice from methylcyclohexane; M.P., 107–108° C. Analysis: percent carbon =58.2, percent hydrogen=4.6, percent nitrogen=8.0, percent chlorine=20.5; calculated for methylene bis-(N-methylphenylcarbamyl chloride), percent carbon =57.6, percent hydrogen=4.6, percent nitrogen=8.0, percent chlorine=20.4.

A polyurethane diamine is prepared by dissolving 13.56 parts of methylene-bis(N-methylaniline) in 350 parts of benzene. 50 parts of calcium hydroxide is added. The mixture is stirred at room temperature and a solution of 44.4 parts of polytetramethyleneether bischloroformate of Example 3 in 175 parts of benzene is added over a period of 2 hours. The mixture is then stirred overnight and then filtered. The benzene solvent is removed from the filtrate by gradually raising the temperature to 100° C. and reducing the pressure to 1 mm. The resulting polyurethane diamine has a molecular weight of 2752 as determined by titration for aromatic amine end groups.

10 parts of the methylene-bis(N-methylphenyl-carbamyl chloride) and 78.5 parts of polyurethane diamine prepared as described above are dissolved at 60° C. in 100 parts of benzene. 3.16 parts of calcium hydroxide is added and the mixture is refluxed with stirring for 36 hours. The mixture is cooled and 0.8 part of phenyl-β-naphthylamine and 1250 parts of tetrahydrofuran are added. The mixture is centrifuged and the calcium salts separated. The solvent is allowed to evaporate and the resulting poly(polytetramethyleneether) urethane polymer is freed of traces of solvent by milling on a rubber mill for 10 minutes at 100° C.

100 parts of the polymer, 40 parts of high abrasion furnace black, 1 part of dicumyl peroxide and 4 parts of N,N′-m-phenylene bismaleimide are compounded on a rubber mill at 26–35° C. for 10 minutes. The compounded stock is cured in molds in a press for 1 hour at 134° C. The resulting elastomer has the following properties in water at 25° C.:

| | |
|---|---|
| Tensile strength at the break, lbs./sq. in. | 1700 |
| Modulus at 300% elongation, lbs./sq. in. | 740 |
| Elongation at the break, percent | 500 |

*Example 7*

100 parts of the poly(polytetramethyleneether) urethane polymer of Example 1 is milled on a rubber mill with 30 parts of high abrasion furnace black, 1 part of N,N′-m-phenylene bismaleimide and 2 parts of dicumyl peroxide. The compounded stock is removed from the mill, placed in molds in a press and cured for 1 hour at 140° C. The cured polymer has the following properties in water at 25° C.:

| | |
|---|---|
| Tensile strength at the break, lbs./sq. in. | 2950 |
| Modulus at 300% elongation, lbs./sq. in. | 2600 |
| Elongation at the break, percent | 330 |

*Example 8*

A poly(polytetramethyleneether) urethane polymer is prepared by adding 52.3 parts of toluene-2,4-diisocyanate to 6.2 parts of ethylene glycol with stirring and heating the reaction mass at 80° C. for 3 hours. The resulting mass is coled to 40° C. and added to 206 parts of polytetramethyleneether glycol having a molecular weight of 1040 at 70° C. over a period of 45 minutes with vigorous agitation. After the addition is complete, the temperature is raised to 80–90° C. and agitation continued for 15 minutes. The mass is then transferred to a polyethylene bag and heated in an oven at 80° C. for 64 hours. A clear, tough, yellow polymer is obtained.

100 parts of the above polymer is milled on a rubber roll mill with 30 parts of high abrasion furnace black, 2 parts of N,N′-m-phenylene bismaleimide and 0.5 part of 1,1′-azobiscyclohexane carbonitrile. The compounded stock is sheeted from the mill, placed in molds in a press and cured 1 hour at 140° C. The cured elastomer shows the following properties in water at 25° C.:

| | |
|---|---|
| Tensile strength at the break, lbs./sq. in. | 2700 |
| Modulus at 300% elongation, lbs./sq. in. | 500 |
| Elongation at the break, percent | 650 |

*Example 9*

The bischloroformate of a polytetramethyleneether glycol of molecular weight 995 is prepared as in Example 4. 89 parts of the polytetramethyleneether glycol bischloroformate is placed in a Waring Blendor and to it it is added simultaneously a solution of 18.1 parts of methylene-bis-(N-methylaniline) in 536 parts of methylene chloride and a solution of 18 parts of sodium carbonate in 400 parts of water. The mass is then stirred 20 minutes at room temperature. 1 part of phenyl-β-naphthylamine is then added and the mass is poured into 2000 parts of water, which is heated to a boil for about 20 minutes. The water is then decanted and replaced with a fresh 2000 parts of water and boiling continued for an additional 20 minutes. The water is decanted and the water process repeated. The poly(polytetramethyleneether) urethane polymer is then separated and washed on a rubber wash mill with water for 10 minutes. The polymer is then dried on a rubber roll mill at 100–105° C.

100 parts of the polymer is milled on a rubber roll mill with 40 parts of conductive channel black, 6 parts of N,N′-m-phenylene bismaleimide and 1 part of dicumyl peroxide. The compounded stock is sheeted from the mill and placed in molds in a press and cured for 1 hour at 150° C. The cured elastomer has the following properties in water at 25° C.:

| | |
|---|---|
| Tensile strength at the break, lbs./sq. in. | 2280 |
| Modulus at 300% elongation, lbs./sq. in. | 1250 |
| Elongation at the break, percent | 450 |

When the amount of dicumyl peroxide used above is increased to 3 parts, an elastomer is obtained which is more tightly cured.

*Example 10*

170 parts of tetrahydrofuran, purified by refluxing over and then distilling from sodium hydroxide and then refluxing over and distilling from lithium aluminum hydride, and 66.8 parts of 3,3-diethyloxetane, purified by distilling from calcium hydride, are mixed and cooled to 0–5° C. There is then passed into the solution 0.4 part of gaseous phosphorus pentafluoride during a period of about 10 minutes while stirring. At the end of the 10 minutes, the mass becomes too viscous to stir. It is then held for 24 hours at 0–5° C.

The mass is dissolved in 2900 parts of tetrahydrofuran and 1 part of phenyl-β-naphthylamine (antioxidant), 29 parts of water, and 29 parts of aqueous ammonia (28%) are stirred in. The copolymer is precipitated by pouring this solution into a large excess of water. The copolymer is collected and washed with water on a rubber wash mill until neutral and then dried on a rubber roll mill at 100–110° C. 194 parts of rubbery copolymer is obtained having an inherent viscosity of 3.1 in 0.1% solution in benzene at 30° C., corresponding to a number average molecular weight of about 200,000.

100 parts of the copolymer is milled on a rubber roll mill at 70–100° C. with 30 parts of high abrasion furnace black, 3 parts of N,N′-m-phenylene bismaleimide and 1 part of dicumyl peroxide. The compounded stock is sheeted from the mill and cured in molds in a press at 150° C. for 1 hour. After standing for 1 day at room temperature at 50% relative humidity, the cured elastomer shows the following properties at 25° C. in water:

| | |
|---|---|
| Tensile strength at the break, lbs./sq. in. | 1400 |
| Modulus at 300% elongation, lbs./sq. in. | 1300 |
| Elongation at the break, percent | 320 |

A control sample is compounded without the N,N′-m-phenylene bismaleimide but otherwise using the same proportion of the same components and cured in the same way. The sample is not cured sufficiently to permit testing.

It is readily apparent that the process of the present invention permits the curing of high molecular weight polymers of tetrahydrofuran, polytetrahydrofuran, and poly (polytetramethyleneether) urethane polymers. It permits the curing of polymers which could not have been cured by the use of an organic peroxide or an azobisaliphatic dinitrile as a free radical generator alone and, in the case of the polymers which were curable by means of peroxide, it permits the use of a much lower concentration of peroxide with attendant reduction of undesirable side reactions and results in cured polymers having better properties over those polymers which were cured by means of the free radical generator alone.

The polymers which are cured by the process of the present invention may be formed into sheets or films or fibers after incorporation of the N,N′-substituted bismaleimide and the free radical generator before heating to cure. These shaped forms may be prepared by extruding the compounded stock through suitable dies. They may also be prepared by dissolving the compounded stock in a volatile solvent and laying down a layer of the solution and allowing the solvent to evaporate or extruding a concentrated solution through a spinneret and the solvent evaporated. The resulting films or fibers are then subjected to heat to cure. The compounded stock may be formed into thin sheets on roller mills and the sheets taken off as unsupported films. If desired, the films may be calendered onto substrates and the composite heated to cure the polymer.

The polymers which are cured according to the present invention may be used generally as polymers which have been cured by the known conventional curing procedures; however, the curing processes of the present invention yield polymers which tend to be more solvent resistant and higher melting. Thus, the poly (polytetramethyleneether) urethane polymers may be used as elastomers to form self-supported articles, coating compositions and unsupported films and fibers.

The polymers may be varied by the incorporation of compounding ingredients at the time that the free radical generator and N,N′-substituted bismaleimide are incorporated in the polymer. Suitable compounding ingredients are carbon black, pigments, etc.

As many widely different embodiments of this invention may be made without departing from the spirit and scope thereof, it is to be understood that this invention is not limited to the specific embodiments thereof except as defined in the appended claims.

What is claimed is:

1. A composition comprising a high molecular weight polymer having a molecular weight of at least about 5000 and being selected from the group consisting of polytetrahydrofuran, copolymers of tetrahydrofuran and a cyclic ether selected from the group consisting of 3 and 4 membered cyclic ethers, and poly (polytetramethyleneether) urethanes, from 0.5 to 10.0% by weight of a compound selected from the group consisting of organic peroxides and azobisaliphatic nitriles, and from 1.0 to 6.0% by weight of a compound of the formula:

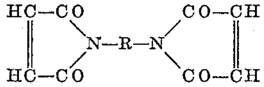

wherein R is selected from the group consisting of alkylene and arylene radicals.

2. A process for curing high molecular weight polymers having a molecular weight of at least about 5000 and being selected from the group consisting of polytetrahydrofuran, copolymers of tetrahydrofuran and a cyclic ether selected from the group consisting of 3 and 4 membered cyclic ethers, and poly (polytetramethylene-ether) urethanes which comprises incorporating with said polymers (*a*) from 0.5 to 10.0% by weight of a compound selected from the group consisting of organic peroxides and azobisaliphatic nitriles, and (*b*) from 1.0 to 6.0% by weight of a compound of the formula:

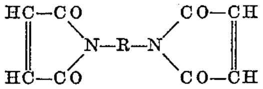

wherein R is selected from the group consisting of alkylene and arylene radicals; and heating said polymers to a temperature of about 50 to 200° C. until a cure is obtained.

3. A process for curing high molecular weight polymers having a molecular weight of at least about 5000 and being selected from the group consisting of polytetrahydrofuran, copolymers of tetrahydrofuran and a cyclic ether selected from the group consisting of 3 and 4 membered cyclic ethers, and poly (polytetramethyleneether) urethanes, which comprises incorporating with said polymers (*a*) from 0.5 to 3.0% by weight of a compound selected from the group consisting of organic peroxides and azobisaliphatic nitriles, and (*b*) from 1.0 to 6.0% by weight of a compound of the formula:

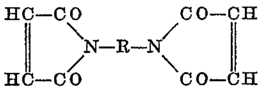

wherein R is selected from the group consisting of alkylene and arylene radicals; and heating said polymers to a temperature of about 50 to 200° C. until a cure is obtained.

4. The process of claim 3 wherein the high molecular weight polymer is a poly (polytetramethyleneether) urethane.

5. The process of claim 3 wherein the high molecular weight polymer is a polytetramethyleneether polymer.

6. A process for curing a high molecular weight poly (polytetramethyleneether) urethane polymer having a molecular weight of at least about 5000 which comprises incorporating with said polymer from 0.5 to 3.0% by weight of bis (a,a-dimethylbenzyl) peroxide and from 1.0 to 6.0% by weight of N,N'-m-phenylene bismaleimide, and heating said polymer to a temperature of about 50 to 200° C. until a cure is obtained.

7. A process for curing a high molecular weight polytetramethyleneether polymer having a molecular weight of at least about 5000 which comprises incorporating with said polymer from 0.5 to 3.0% by weight of bis (a,a-dimethylbenzyl) peroxide and from 1.0 to 6.0% by weight of N,N'-m-phenylene bismaleimide, and heating said polymer to a temperature of about 50 to 200° C. until a cure is obtained.

8. A process according to claim 6 wherein the poly (polytetramethyleneether) urethane polymer is prepared from a polytetramethyleneether glycol, an organic diisocyanate, and a chain-extending agent.

9. A process according to claim 6 wherein the poly (polytetramethyleneether) urethane polymer is obtained by the reaction of the bischloroformate of a polyetetramethyleneether glycol with an organic diamine.

10. The composition of claim 1 in the form of a film.

11. The cured product obtained by the process of claim 3.

12. The cured product obtained by the process of claim 3 in the form of a film.

13. The composition of claim 1 in the form of a fiber.

14. The cured product obtained by the process of claim 2.

References Cited in the file of this patent

UNITED STATES PATENTS 2,444,536 Searle ------------------ July 6, 1948